Patented Feb. 13, 1934

1,947,432

UNITED STATES PATENT OFFICE

1,947,432

STABLE VITAMIN PREPARATION

Ralph C. Huston, East Lansing, Mich., and Howard D. Lightbody, Pittsburgh, Pa., assignors to The State Board of Agriculture of the State of Michigan, a corporation of Michigan No Drawing. Application January 31, 1930
Serial No. 425,070

4 Claims. (Cl. 99—11)

The invention relates to the treatment of foods, feeds and pharmaceutical products or component parts thereof, for the purpose of protecting and preserving within them certain natural occurring compounds commonly spoken of as food accessories or vitamins.

We have discovered that the vitamins of various products such as milk, butter, cod liver oil, corn oil etc. may be preserved for a considerable length of time by treatment with small quantities of a phenolic antioxygen such as di or trihydric phenols or their derivatives. Our experiments have shown that while vitamin-bearing products such as cod liver oil will upon aging become much less potent insofar as their vitamin activity is concerned, this potency may be retained almost undiminished by the addition of certain substances such as hydroquinone, pyrocatechol, resorcinol, pyrogallol, phloroglucinol etc. This is particularly true of materials containing the vitamin A or antixerophthalmic and growth promoting factor and the vitamin D or antiratchitic factor. Our experiments have shown very conclusively that the presence of a small amount of a so-called phenolic antioxygen will preserve the vitamins A and D.

As a typical experiment, two groups of young rats were fed on diets relatively poor in vitamin A. The diets were identical except that one contained a very small amount of protective phenol (hydroquinone). Those animals receiving the untreated diet were subnormal in their growth and developed xerophthalmia, while those receiving the diet which contained the phenol (hydroquinone) grew much more rapidly and were protected from xerophthalmia.

In another typical experiment two groups of rats were fed on rachitic diets until symptoms of the disease appeared. They were then transferred to diets which had been stored for a considerable period and which contained cod liver oil. These diets were identical excepting that one contained a fraction of one per cent of protective phenol (hydroquinone). Those animals which received the treated diet showed better calcification and bone growth than did the controls.

In order to preserve the vitamin activity in accordance with our invention the phenolic body or other antioxygen may be dissolved directly in the vitamin containing oil with or without heat or stirring. Another method consists in dissolving the oil and the phenol in a common solvent such as ether and the phenol rich mixture be added after evaporation of the solvent to a larger quantity of oil or to a food mixture. When added to a food mix the phenol may be introduced either with the oil or it may be worked into the mixture as a whole. In the preparation of emulsions the phenol may be added to either the oil or the water.

In whatever way the phenol or other antioxygen compound is added to the vitamin-bearing material, the essential characteristic of our invention will be due to the preservative action on the vitamin factor of the antioxygen.

While we have specifically enumerated above under antioxygens particularly the di and trihydric phenols such as hydroquinone, pyrocatechol, resorcinol, pyrogallol, phloroglucinol etc., it is to be understood that in its broadest aspects our invention contemplates other products where the vitamin-bearing materials are associated with preservatives of the antioxygen type.

What we claim as our invention is:

1. A stable vitamin preparation comprising a vitamin-containing product of the class consisting of milk, butter, fish liver oil, and corn oil and a relatively small amount of hydroquinone as a stabilizing agent.

2. A stable vitamin preparation consisting of fish liver oil having high concentration of vitamins A and D and a relatively small amount of hydroquinone as a stabilizing agent.

3. A stable vitamin preparation comprising a vitamin containing fish liver oil and a relatively small amount of hydroquinone as a stabilizing agent.

4. A stable vitamin preparation comprising cod liver oil containing vitamins A and D and a relatively small amount of hydroquinone as a stabilizing agent.

RALPH C. HUSTON.
HOWARD D. LIGHTBODY.